Nov. 8, 1966
R. E. CROSS ETAL
3,283,664
FEED AND DRIVE UNIT FOR A MACHINE TOOL
Filed March 9, 1965
2 Sheets-Sheet 1
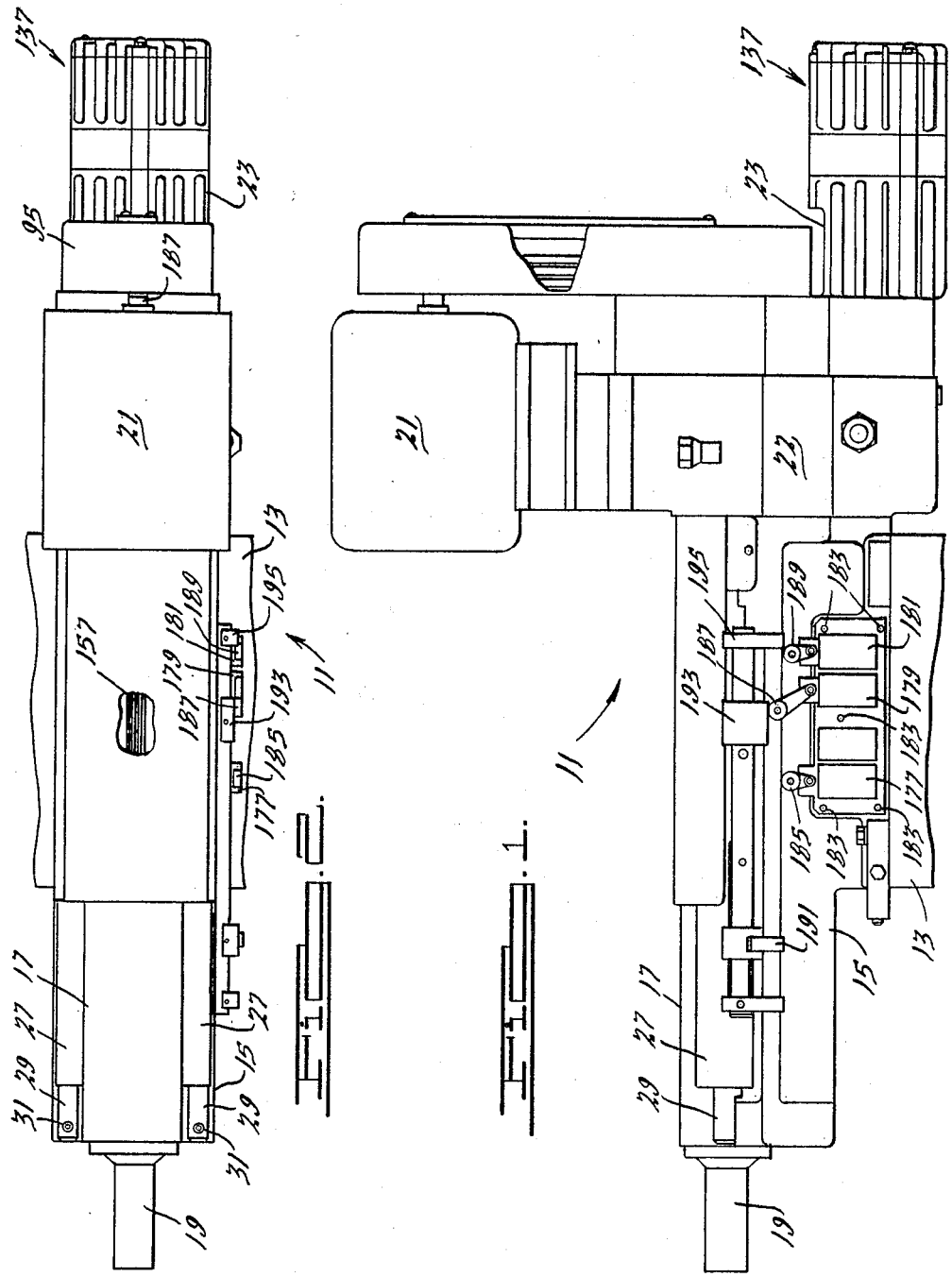
INVENTORS.
Ralph E. Cross.
Kurt O. Tech
BY Guy Donald Pierce
Harness, Dickey & Pierce
ATTORNEYS

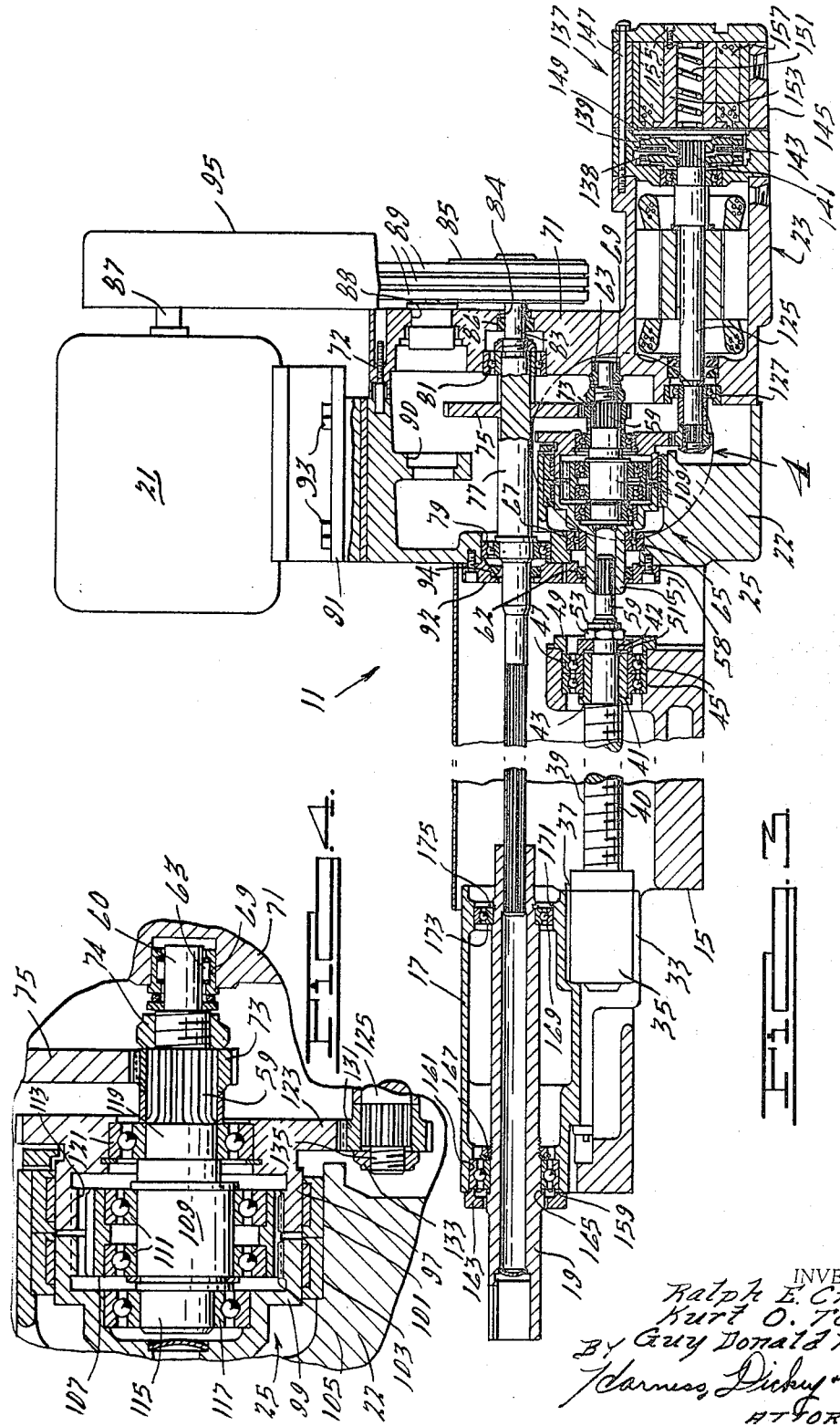

3,283,664
FEED AND DRIVE UNIT FOR A MACHINE TOOL
Ralph E. Cross, Grosse Pointe Shores, Kurt O. Tech, Grosse Pointe Woods, and Guy Donald Pierce, Franklin, Mich., assignors to The Cross Company, Fraser, Mich., a corporation of Michigan
Filed Mar. 9, 1965, Ser. No. 438,277
4 Claims. (Cl. 90—14)

This invention relates generally to machine tools, and particularly to an improved reciprocable tool carriage assembly for a rotatable machine tool and to the drive mechanism therefor.

As used herein, the term traverse includes carriage and tool movement from a retracted position to a position adjacent the workpiece ready for cutting and at the completion of cutting back to the retracted position. The term "feed" includes movement of the carriage and tool from the position ready for cutting through the cutting stroke; the term "advance" includes both traverse and tool feed; and the term "tool drive movement" defines rotational movement of the tool about a longitudinal axis.

The machine tools to which the present invention relates include those rotatable about a central longitudinal axis and movable along this axis in effecting the cutting or working operation. Machine tools requiring this type of advance and feed include those for boring, drilling, reaming and milling various workpieces and are conventionally carried by an advancing tool carriage. In this type of machine, it is generally necessary that the carriage and the tool, which is generally fixed to a rotatable spindle, advance or traverse from a retracted position to a position adjacent the workpiece. Thereafter, the carriage and the driven rotating tool are advanced or fed along the tool axis of rotation through the cutting stroke at the completion of which they are withdrawn to the retracted position.

In designing the drive mechanism for this type of assembly, several factors must be considered. Initially, it is desirable that the tool and tool spindle be traversed rapidly both to and from the cutting position to minimize tool cycle time and that they be fed slowly and guided accurately through the cutting stroke to prevent workpiece or tool damage. Drive assemblies adapted to perform this type of machine tool advance are known; however, they are conventionally relatively large and cumbersome and therefore require considerable plant floor space as well as heavy duty and expensive precision guide assemblies. In addition, relatively high maintenance and repair costs for these assemblies because of both size and general inaccessibility result in generally high overall production costs and are therefore undesirable.

In addition to advancing the carriage and machine tool, a mechanism is required for tool drive or effecting tool rotation during the cutting stroke. This drive mechanism is often separate and apart from the advance drive mechanism but in any event further increases the size, weight and cost of the overall machine.

An important object therefore of the present invention is an improved simplified varied speed reciprocable machine tool carriage having a rotatable tool and an improved drive mechanism therefor.

A further object of the present invention is a machine tool carriage of the above character wherein the mechanism therefor is a compact unit independent of the carriage.

A further object of the present invention is a machine tool carriage and drive assembly of the above character wherein the drive is designed to impart rapid and slow advance movement to the tool carriage with simultaneous tool rotation.

A further object of the present invention is a machine tool carriage and drive assembly of the above character which is constructed for easy maintenance and repair.

A further object of the present invention is a machine tool carriage and drive assembly of the above character wherein a minimum of components partake of carriage advance.

A further object of the present invention is a machine tool carriage and drive assembly of the above character wherein the tool is rotated during a dwell in the carriage advance at the end of the carriage and tool feed.

A further object of the present invention is a tool advance and drive unit of the above character which is relatively inexpensive to manufacture, compact and durable in construction and accurate in performance.

Further objects and advantages of the present invention will become more apparent from the following detailed description and claims taken in conjunction with the drawings in which:

FIGURE 1 is an elevational view of a machine embodying a carriage and drive assembly constructed according to the present invention;

FIG. 2 is a top plan view of the structure of FIG. 1;

FIG. 3 is a sectional view of the structure of FIG. 2 taken along the line 3—3 thereof; and FIG. 4 is an enlarged view of the portion of FIG. 3 within the circle "4."

Broadly described, the present invention includes a machine tool carriage movable longitudinally through rotation of a feed screw connected to a pair of controlled motors by a compact and easily accessible differential drive mechanism whereby to effect rapid forward and reverse traverse movement and relatively slow forward feed movement of the tool and tool carriage as well as tool rotation during tool and carriage advance. The motors and differential have stationary mounts and do not partake of tool carriage movement.

Referring now to the drawings and particularly FIGS. 1 and 2, a machine tool carriage and drive assembly constructed according to the present invention is indicated generally at 11 and is supported upon a frame including a base 13 through an elongated bed 15 fixed thereon. A tool carriage 17 having a rotatable tool spindle 19 is horizontally slidably disposed upon the bed 15 through a pair of spaced elongated sleeves 27 slidably receiving respective guide bars 29 fixed at each end to the bed 15 by screws 31. A spindle and feed motor 21 and a traverse motor 23 are each mounted upon a housing 22 fixed to the bed 15 and are operatively connected through a drive train including a transmission 25 to a rotatable feed screw 39 adapted to move the carriage 17 longitudinally along the bed 15 and by controlling the motors 21 and 23, the speed and direction of carriage movement is also controlled.

The feed screw 39 has a threaded portion 40 threadedly received within a running nut 35 which is retained on the carriage 17 by any suitable means, such as, for example, a pair of downwardly depending lugs, only one of which is shown at 33, FIG. 3. A key 37 holds the nut 35 against rotation relative to the carriage 17. Thus, since the nut 35 does not turn, the need for a thrust bearing is eliminated.

The feed screw 39 has stepped portions 41 and 42, portion 41 being rotatably supported within the bed member 15 by a spacer sleeve 43. This sleeve extends through and snugly fits the inner races of a pair of ball bearings 45 positioned within a counterbore 47 formed in the bed 15. A bearing retainer 49 fixed to the bed 15 by screws (not shown) holds the outer races of the bearings 45 within the counterbore 47. Another retainer 51 surrounding the stepped portion 42 of the feed screw 39 has an axial flange which engages and holds the inner races of the bearings 45. A nut 53 threaded upon the screw portion 42 is tightened against the inner race of the bearings 45 to hold the latter against a radial flange of the sleeve 43 as shown to hold the parts of the bearing assembly together and to prevent the screw from pulling out of the bearings 45.

The end of the screw 39 beyond the stepped portions 41 and 42 is further reduced in diameter and is splined at 59 and is nonrotatably received within a hollow, splined output shaft 37 of the speed reducing transmission 25. Thus, rotation of the output shaft 57 causes rotation of the feed screw 39 and through threaded engagement with the running nut 35 imparts longitudinal movement to the carriage 17 illustrated along the guide bars 29. This carriage 17 may carry any part or mechanism of a machine tool that has a reciprocatory motion in the operation of the machine. For example, the tool spindle 19 mounted on the carriage or for movement therewith may carry a conventional machine tool such as a boring or reaming tool.

The speed reducing transmission 25 illustrated in FIG. 3 and forming part of the drive train preferably is of the differential type and can be the type described in U.S. Patent No. 1,543,791 developed by Universal Gear Corporation of Indianapolis, Indiana, and sold under the name Heliocentric Drive; or the differential unit developed by the United Shoe Machinery Corporation, in Beverly, Massachusetts, and sold under the name Harmonic Drive, or the modified unit particularly illustrated and described below. This differential drive 25 shown in FIGS. 3 and 4 adapted to impart rapid or slow rotational movement to the feed screw 39, the particular form here shown has an input shaft 59 the end 60 of which is removably supported by a roller bearing 63 in coaxial alignment with an output shaft 57 which is supported by a ball bearing 65. The output shaft 57 extends through a removable retaining cup 58 fixed to the housing 22 and an oil seal 62 held thereby. As shown, the ball bearing 65 is seated in a counterbore 67 of the housing 22 removably fixed to the bed 15 by means (not shown). The roller bearing 63 is press-fitted in a bore 69 formed in a cover plate 71 which removably fixed to the housing 22 in the conventional manner by a plurality of dowel pins and machine screws (not shown). The cover plate 71 also preferably is provided with a plurality of ejector screws 72 (only one of which is shown) for forcing the plate off of the dowels when the cover is removed for inspection or service of the drive.

The input shaft 59 has a gear 73 splined thereto and held thereon by a nut 74 for rotation therewith and in position to engage a pinion 75 keyed to a shaft 77 rotatably supported within the housing 22 and the cover plate 71 by a spaced-apart pair of ball bearings 79 and 81 respectively. The shaft 77 has one end 83 extending through an opening 84 in the cover plate 71 and is surrounded by an oil seal 86. The other end of the shaft 77 extends through a removable retaining cup 92 provided with an oil seal 94 and which also serves to hold the ball bearing 79 in place. A pulley 85 is removably fixed to the shaft end 83 and is connected for rotation with an output shaft 87 of the spindle feed motor 21 by belts 89 and another pulley (not shown). The motor 21 has a mounting plate 91 fixed atop the housing 61 by bolts 93, and a removable shield 95 is provided to prevent inadvertent injury to hands or clothing. With this construction, the carriage 17 can be driven at a slow rate by the motor 21 by virtue of the speed reduction through gears 75 and 73 and through the differential transmission 25. An additional opening 88 and shaft mounting 90 are provided in the cover plate 71 and housing 22, respectively, should it be desired to provide a further speed reduction to the gear 75 from the motor 21.

It is to be noted that the drive motors 21 and 23 as well as the gear train which includes the differential drive 25 are all stationarily mounted relative to the base 13 and that only the tool carriage 17 and the spindle 19 advance during the tool cycle. This feature is advantageous both for the reason that the motors and drive train and the carriage guide assembly are subjected to less wear during use, as well as for the reason that the carriage and spindle being the only movable components can more easily be positioned for accurate operation.

Another feature of this invention resides in the relative ease with which any of the drive train components can be removed and replaced. When this becomes necessary, one need only remove the pulley 85 from the end 83 of the shaft 77, remove the screws which fasten the cover to the housing and operate the ejector 72 to effect removal of the cover plate 71 from the housing 22. When the cover plate 71 is removed, the motor 23 comes with it as does the roller bearing 63 which pulls off the end 60 of the shaft 59. The shaft 77, however, pulls out of the opening 84 and remains intact within the housing 22. Thus, the entire drive train, including the differential drive 25, is made freely accessible for any maintenance desired with a minimum of effort and without disrupting any part of the tool carriage.

In order to facilitate rapid traverse movement of the carriage 17, the drive assembly is designed to selectively impart rotation to the transmission output shaft 57 from the traverse motor 23 to the exclusion of the input shaft 59 and so that the manner in which this is accomplished may be understood, a description of the transmission 25 follows.

As best seen in FIG. 4, the transmission 25 includes a pair of annular cages 97 and 99 rotatably supported within the housing 61 by a pair of roller type bearings 101 and 103, respectively. The cage 99 preferably is formed integral with the output shaft 57 and is provided with an internal ring gear 105 also formed as an integral part thereof. An external ring gear 107 is rotatably mounted upon an eccentric 109 and on the input shaft 59 by a pair of laterally spaced ball bearings 111 and is meshed with the internal ring gear 105 and with an internal ring gear 113 formed on the cage 97. As suggested, the bearings 65 and 103 support the cage 99 for rotation and a ball bearing in the cage rotatably supports the inner end portion 115 of the input shaft 59. Similarly, the cage 97 is rotatably supported upon a cylindrical surface 119 of the input shaft by a ball bearing 121 and in addition, the cage 97 has a spur gear 123 formed integrally therewith. The reversible traverse motor 23 has an output shaft 125 rotatably supported within the housing 61 by a ball bearing 127 and has a reduced diameted end 135 splined to a pinion 131 which meshes with the gear 123. A nut 133 is threaded on an end 135 of the shaft 125 to retain the pinion 131 thereon. Thus, when the motor 23 is energized to rotate the shaft 125, the pinion 131 rotates concurrently therewith thereby drivingly rotating the gear 123 and rotating the cage 97. As will be hereinafter described, the cage 99 rotates at substantially the same speed as the cage 97 as the latter is rotated, and through the output shaft 57, the screw 39 and the nut 35, the carriage 17 and spindle 19 are rapidly traversed.

The motor 23 is of the reversible type to effect traverse movement of the carriage 17 and spindle 19 in either longitudinal direction. In addition, the traverse motor 23 is provided with a braking mechanism 137 which, when activated, prevents rotation of the motor shaft 125. As shown in FIG. 3, this braking mechanism 137 includes a pair of spaced-apart brake discs 138 and 139 splined to an end 141 of the shaft 125 and rotatable therewith. An annular brake plate 143 is interposed between the discs 138 and 139 and is fixed at its outer end to a retainer cover 145 removably attached to the traverse motor housing by a plurality of studs 147. An armature plate 149 is positioned adjacent the disc 139 and is normally biased into engagement therewith by a relatively strong compression spring 151 positioned within a core 153 fixed to the retainer cover 145 by a screw 155. A brake coil member 157 surrounds the core 153 and is adapted, when energized to draw the armature 149 away from the brake disc 139 and in a direction compressing the spring 151. The brake discs 138 and 139 have at least a portion of their faces constructed of a friction material. Thus, when the coil 157 is de-energized, the force of the spring 151 on the armature 149 forces the disc 139 into frictional contact with the plate 143 which, in turn, frictionally contacts the disc 138. Since the plate 143 is fixed to the retainer 145 and the discs 138 and 139 are splined to the shaft portion 141, frictional engagement between the discs 138 and 139 and the plate 143 prevents rotation of the motor shaft 125. However, when the coil 157 is energized drawing the armature 149 against the spring 151, the discs 138 and 139 and therefore the shaft 125 are free to rotate. When the brake discs 138 and 139 are engaged with the plate 143 and the shaft 125 prevented from rotating, the pinion 131 and gear 123 and therefore the cage 97 are also prevented from rotating. Under these conditions, rotation of the transmission input shaft 59 by the spindle and feed motor 21 and through shaft 87, belts 89, pulley 85, shaft 83 and gears 75 and 73 rotates the eccentric portion 109 which carries successive teeth of the gear 107 into engagement with the successive gear teeth on the stationary cage member 97 in such a manner that the gear 107 rotates about its axis an arcuate distance equal to one or two gear teeth per revolution of the eccentric 109.

Specifically, if the internal gear 113 on the cage member 97 has, for example, 132 teeth and the gear 107 has 130 teeth, the gear 107 rotates a distance equal to two teeth for each revolution of the eccentric 109, thereby providing a gear reduction of 66:1. Since the gear 107 also engages the internal ring gear 105 on the cage 99, this cage and therefore the output shaft 57 rotates at the same speed as the gear 107, which is, as indicated above, a reduction of 66:1 relative to the speed of the input shaft 59.

When the motor 23 is energized and the shaft 125 rotated, pinion 131 splined thereto rotates the gear 123 and therefore the cage 97. Since the intenal ring gear 113 on the cage 97 engages the ring gear 107, rotation of the cage 97 imparts rotation to the ring gear 107 at substantially the same speed which thereby causes rotation of the cage 99 and the output shaft 57. The internal ring gears 113 and 105 on the cages 97 and 99, respectively, preferably are substantially identical. Thus, for example given above, the rotational speed of the cage 99 differs from that of the cage 97 by only two teeth per revolution. The traverse motor 23 may be a relatively high-speed motor and where energized, imparts rotation to the transmission output shaft 57 at a speed substantially equal to that of the motor shaft 125 reduced only by the pinion 131 and gear 123. This results in relatively rapid rotation of the feed screw 39 and therefore rapid traversing movement of the tool carriage 17 and since the motor 23 is reversible, the carriage 17 is traversed rapidly in both directions.

The spindle and feed motor 21 may have a rotational speed substantially the same as or less than that of the traverse motor 23 as desired. In any event, the rotational speed imparted to the transmission output shaft 57 by the spindle and feed motor 21, when the shaft 125 of the traverse motor 23 is prevented from rotating by the brake device 137, is reduced through the belts 89 and pulley 85, the gears 75 and 73 and the transmission 25 and is therefore substantially less than that imported by the traverse motor 23. Thus, after the tool carriage 17 has been traversed to position the tool adjacent the workpiece, the traverse motor brake 137 is energized and the tool carriage 17 and tool fed slowly by the spindle and feed motor 21 after which the traverse motor brake 137 is de-energized and the motor 23 energized in a reverse direction to withdraw the tool carriage 17 and the tool.

It will be understood from the above that since the rotation imparted to the feed screw 39 by the spindle and feed motor 21 is relatively small compared with that imparted during rotation of the traverse motor 23 that the spindle and feed motor 21 can be energized or not during forward or reverse traversal of the tool and tool carriage 17.

Another feature of the present invention is the fact that the tool spindle is driven by the spindle and feed motor 21. Thus, as seen in FIG. 3, the shaft 77 has a reduced diameter portion 158 slidably splined to the tool spindle 19. The spindle 19, in turn, is rotatably carried adjacent one end within the tool carriage 17 by a ball bearing 159 retained in a bore 161 in the carriage by a retainer cap 163 and on the spindle by a shouldered portion 165 and a retaining ring 167. Another bearing 169 is rotatably disposed in a cylindrical portion 171 of the carriage 17 and rotatably supports the spindle 19 adjacent its other end and is retained thereon by a shoulder portion 173 and a snap ring 175. Thus, the spindle 19 moves conjointly with the carriage 17 and at the same time is freely rotatable therein conjointly with the shaft 77.

In use, the coil 157 is energized to release the brake 137 and the traverse motor 23 is energized to rapidly traverse the carriage 17 to a position where the tool (not shown) is adjacent the workpiece. At this point, the traverse motor 23 is de-energized as is the brake coil 157 and the brake 137 is applied. Thereafter, the feed motor 21 which may or may not have been operating during traversal of the carriage 17, takes over and slowly feeds the carriage and tool spindle 19 through the tool stroke while rapidly rotating the tool spindle and a tool carried thereby. After completion of the tool stroke, the traverse motor 23 is energized in a reverse direction to rapidly withdraw the tool carriage 17.

The tool carriage and spindle drive assembly of the present invention is adapted for automatically controlled movement through the forward traversing, feed and return traversing movements. Thus, as seen in FIGS. 1 and 2, a limit switch assembly including limit switches 177, 179, and 181 is mounted on the base 15 as by screws 183. These switches are provided with pivotally mounted arms 185, 187 and 189, respectively, which are engageable by trips 191, 193 and 195 fixed to the carriage 17. Initially, the carriage 17 is positioned rearwardly with the trip 191 engaging the arm 185 of switch 177 and with the motors 21 and 23 and coil 151 de-energized. A master switch (not shown) is closed to energize the motor 23 and the coil 151, and the motor 21 whereupon the carriage 17 is rapidly traversed in a forward direction until the trip 193 engages the arm 187 of switch 179. This de-energizes the traverse motor 23 and the coil 151 thereby locking the shaft 125 of the motor 23 and therefore the cage member 97 against rotation. The spindle and feed motor then takes over rotating the feed screw 39 and feeding the carriage 17 at a slow rate while rapidly rotating the tool spindle 19. This continues until the trip 195 engages the arm 189 of the switch 181 whereupon the coil 157 is energized and the traverse motor 23 energized in a reverse direction thereby causing the tool carriage 17 to rapidly withdraw until the trip 191 engages the arm 185 of the switch 177 which de-energizes the entire system.

While a preferred embodiment of the present invention has been illustrated and described above, various additions, substitutions, modifications and omissions may be made thereto without departing from the spirit of the invention as encompassed by the appended claims.

What is claimed is:
1. In a machine tool,
   a stationary bed,
   a tool carriage
      supported upon said bed for longitudinal movement therealong,
   a tool spindle mounted for rotation in said carriage and movable
longitudinally therewith,
a housing fixed to said bed and
having
a removable cover plate
at one end thereof,
a drive mechanism
for said carriage and said spindle,
said drive mechanism
including
a speed reducing unit
having
a relatively high-speed input shaft
rotatably and removably supported at one end
thereof by said cover plate and
a relatively low-speed output shaft
rotatably supported by said housing,
said input and output shafts being disposed in
alignment with each other and operatively connected by differential gear means mounted in
and contained by cage means rotatably supported within said housing and characterized
by a driving connection between said cage means
and said output shaft through said differential
gear means,
means
operatively connecting said output shaft to said
tool carriage,
means
mounting said cage means for rotation around said
input shaft,
said cage means
having
a first driven member
mutually rotatable therewith,
a reversible first rotary drive means
carried by and supported within said cover plate
and
having
an output shaft
extending within said housing and drivingly connected to said driven member,
a second driven member
having
an intermediate portion
rotatably supported within said housing and operatively connected to said input shaft,
said second driven member
having
one end
drivingly engaging said tool spindle,
a second rotary drive means
mounted upon said housing and spaced from said
cover plate and
having
a driving connection
with said second driven member,
said last-mentioned driving connection being disengageable whereupon removal of said cover
plate permits free access to said drive mechanism.

2. In a machine tool,
a stationary bed,
a tool carriage
supported upon said bed for longitudinal movement therealong,
a tool spindle
rotatably carried by said carriage and movable
longitudinally therewith,
a housing fixed to said bed and
having
a removable cover plate
at one end thereof,
a drive mechanism
for said carriage and said spindle,
said drive mechanism
including
a speed reducing unit
having
a relatively high-speed input shaft
rotatably and removably supported by said cover
plate and
a relatively low-speed output shaft
rotatably supported by said housing
said input and output shafts arranged in alignment
with each other and operatively connected by
differential gear means mounted in and contained by cage means rotatably supported within said housing and characterized by a driving
connection between said cage means and said
output shaft through said differential gear means,
means
operatively connecting said output shaft to said
tool carriage,
means
mounting said cage means for rotation around
said input shaft,
said cage means
having
a first driven member
mutually rotatable therewith,
a reversible first rotary drive means
carried by and supported within said cover plate
and
having
an output shaft
extending within said housing and drivingly connected to said driven member,
a second driven member
having
an intermediate portion
rotatably supported within said housing and operatively connected to said input shaft,
said second driven member
having
one end
drivingly engaging said tool spindle, and
the other end
extending outwardly of and rotatably and removably supported by said cover plate,
a second rotary drive means
mounted upon said housing and drivingly engaging
the other end of said second driven member,
said second rotary drive means being disengageable from said second driven member whereupon
removal of said cover plate permits free access
to said drive mechanism.

3. In a machine tool,
a stationary bed,
a tool carriage
supported upon said bed for longitudinal movement therealong,
a tool spindle
rotatably carried by said carriage and movable
longitudinally therewith,
a housing fixed to said bed and
having
a removable cover plate
at one end thereof,
a drive mechanism
for said carriage and said spindle,
said drive mechanism
including
a speed reducing unit
having
a relatively high-speed input shaft
rotatably and removably supported by said cover
plate and a relatively low-speed output shaft
  rotatably supported by said housing
    said input and output shafts arranged in alignment with each other and operatively connected by differential gear means mounted in and contained by cage means rotatably supported within said housing and characterized by a driving connection between said cage means and said output shaft through said differential gear means,
means
  operatively connecting said output shaft to said tool carriage,
means
  mounting said cage means for rotation around said input shaft,
  said cage means
    having
a first gear
  formed on said cage means,
a reversible first rotary drive means
  carried by and supported within said cover plate and
  having
an output shaft
  extending within said housing and
  having
a pinion thereon
  drivingly engaging said first gear,
selectively operable brake means
  for said first rotary drive means,
a shaft
  having
an intermediate portion
  rotatably supported within said housing and provided with a pinion drivingly engaging a second gear on said input shaft,
  said shaft
    having
one end
  drivingly engaging said tool spindle, and
the other end
  extending outwardly of and rotatably and removably supported by said cover plate,
a second rotary drive means
  mounted upon said housing and spaced from said cover plate and drivingly engaging the other end of said shaft,
  said second rotary drive means being disengageable from said shaft whereupon removal of said cover plate permits free access to said drive mechanism.

4. In a machine tool,
a stationary bed
  having
laterally spaced longitudinally extending guide means rigidly mounted thereon,
a tool carriage
  slidably supported upon said guide means,
a tool spindle
  rotatably carried by said carriage and movable longitudinally therewith,
a housing fixed to said bed and
  having
a removable cover plate
  at one end thereof,
a drive mechanism
  for said carriage and said spindle,
  said drive mechanism
    including
a speed reducing unit
  having
a relatively high-speed input shaft
  and
a relatively low-speed output shaft
  arranged in alignment with each other and operatively connected by differential gear means mounted in and contained by cage means rotatably supported within said housing and characterized by a driving connection between said cage means and said output shaft through said differential gear means,
  said output shaft being rotatably supported by and extending through and drivingly engaging a feed screw
    rotatably supported by said bed,
  said feed screw threadedly engaging a running nut
    non-rotatably carried by said tool carriage,
  said cage means being rotatably mounted about said input shaft and
    having
a first driven member
  mutually rotatable therewith,
a reversible first rotary drive motor
  carried by and supported by said cover plate and
  having
an output shaft
  drivingly connected to said first driven member,
a shaft means
  rotatably supported within said housing and drivingly engaging said input shaft,
  said shaft means
    having
one end
  extending through said housing and drivingly engaging said spindle,
a second rotary drive motor
  mounted upon said housing and drivingly engaging said shaft means.

References Cited by the Examiner

UNITED STATES PATENTS 2,167,673   8/1939   Oberhoffken _____ 77—32.8
3,090,266   5/1963   Wagner.

WILLIAM W. DYER, Jr., *Primary Examiner.*

GERALD A. DOST, *Assistant Examiner.*